US012803458B2

(12) United States Patent
Fu et al.

(10) Patent No.: US 12,803,458 B2
(45) Date of Patent: Nov. 17, 2026

(54) POWER SUPPLY

(71) Applicant: Delta Electronics (Shanghai) Co., Ltd., Shanghai (CN)

(72) Inventors: Donglin Fu, Shanghai (CN); Yuesen Guo, Shanghai (CN); Hongming Li, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 162 days.

(21) Appl. No.: 19/034,319

(22) Filed: Jan. 22, 2025

(65) Prior Publication Data

US 2025/0247012 A1 Jul. 31, 2025

(30) Foreign Application Priority Data

Jan. 31, 2024 (CN) ........................ 202410138967.X

(51) Int. Cl.
*H02M 7/217* (2006.01)
*H02M 7/00* (2006.01)

(52) U.S. Cl.
CPC ........... *H02M 7/003* (2013.01); *H02M 7/217* (2013.01)

(58) Field of Classification Search
CPC .......... H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 7/53871; H02M 2007/4803; H02M 2007/4822
See application file for complete search history.

(56) References Cited

U.S. PATENT DOCUMENTS

2023/0170819 A1* 6/2023 Wang ...................... H01F 27/06 361/760

FOREIGN PATENT DOCUMENTS

| | | | |
|---|---|---|---|
| CN | 203241915 | U | 10/2013 |
| CN | 205004332 | U | 1/2016 |
| CN | 106843611 | A | 6/2017 |
| CN | 207459970 | U | 6/2018 |
| CN | 114094369 | A | 2/2022 |
| CN | 114267972 | A | 4/2022 |

* cited by examiner

*Primary Examiner* — Bryan R Perez

(74) *Attorney, Agent, or Firm* — KIRTON McCONKIE; Evan R. Witt

(57) ABSTRACT

A power supply is provided. The transformer is disposed on the upper surface of the main board and electrically connected with the main board. The rectifier assembly is disposed on one side of the upper surface of the main board and electrically connected with the transformer. The output of the transformer is rectified by the rectifier assembly. The first output busbar and the second output busbar are disposed on the upper surface of the main board. The first sub busbar of the first output busbar and the third sub busbar of the second output busbar are connected with the rectifier assembly. The second sub busbar of the first output busbar and the fourth sub busbar of the second output busbar are parallel to the main board and extended away from the transformer.

15 Claims, 14 Drawing Sheets

POWER SUPPLY

CROSS-REFERENCE TO RELATED APPLICATION

This application claims priority to China Patent Application No. 202410138967. X filed on Jan. 31, 2024, the entire contents of which are incorporated herein by reference for all purposes.

FIELD OF THE INVENTION

The present disclosure relates to power electronics and more particularly to a power supply.

BACKGROUND OF THE INVENTION

With the rise of large-scale AI servers, the demand for high-power power supplies has increased. In the field of the power supply, the output current from the transformer of a conventional power supply is rectified by a rectifier board soldered on the main board, and the output current returns to the main board. Then, the output current is transmitted to the gold finger board via the busbar on the main board, and ultimately, the output current is outputted to the external system. Namely, the output current from the transformer disposed within the power supply is transmitted sequentially through the rectifier board, the main board, the busbar, and the gold finger board. Consequently, the transmission path of the conventional power supply is longer when the conventional power supply transmits the power to the external system via the gold finger board. Moreover, the conventional power supply has a relatively large number of solder joints, which are disposed between the rectifier board and the main board, between the busbar and the main board, and between the gold finger board and the busbar, this results in higher path impedance, consequently leading to greater losses in the conventional power supply. Besides, since the gold finger board is only surface-embedded with copper, the current can only be conducted through the surface layer of the gold finger board, weakening the current-carrying capacity of the conventional power supply, especially in high-current scenarios. In these scenarios, the temperature and loss of the power supply are significantly increased.

Therefore, there is a need of providing a power supply to obviate the drawbacks encountered from the prior arts.

SUMMARY OF THE INVENTION

The object of the present disclosure is to provide a power supply with shorter transmission paths, lower path impedance and higher power density.

In accordance with an aspect of the present disclosure, a power supply is provided. The power supply includes a main board, a transformer, a rectifier assembly, a first output busbar and a second output busbar. The main board includes an upper surface and a lower surface. The transformer is disposed on the upper surface of the main board and electrically connected with the main board. The rectifier assembly is disposed on one side of the upper surface of the main board and electrically connected with the transformer. The rectifier assembly is configured to rectify the output of the transformer. The first output busbar is disposed on the upper surface of the main board. The first output busbar includes a first sub busbar and a second sub busbar. The first sub busbar and the rectifier assembly are connected with each other. The second sub busbar is parallel to the main board and extended in a direction away from the transformer. The second output busbar is disposed on the upper surface of the main board. The second output busbar includes a third sub busbar and a fourth sub busbar. The third sub busbar and the rectifier assembly are connected with each other. The fourth sub busbar is parallel to the main board and extended in the direction away from the transformer.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
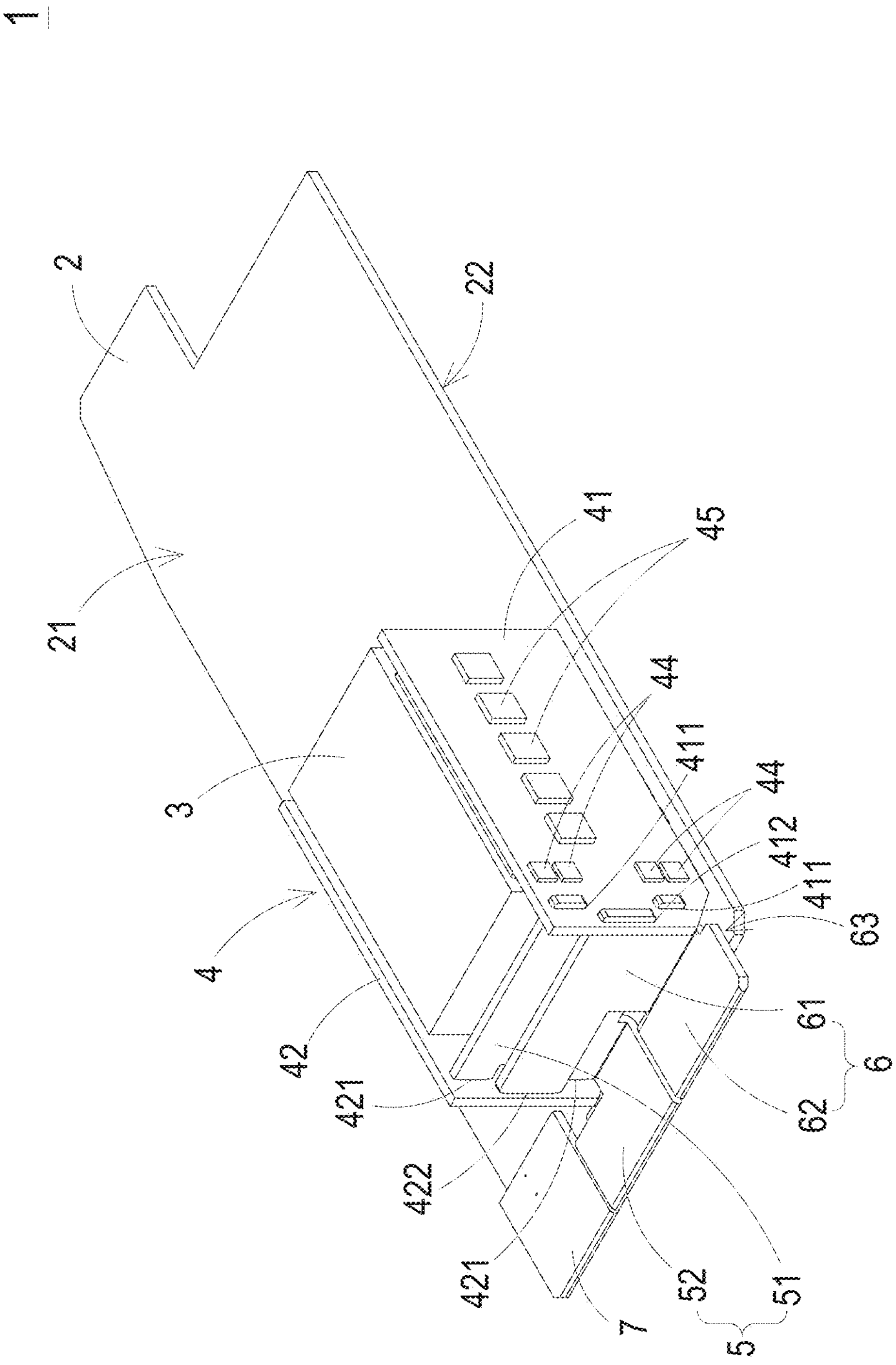
FIG. 1 is a schematic view illustrating a power supply according to a first embodiment of the present disclosure.
Figure 2:
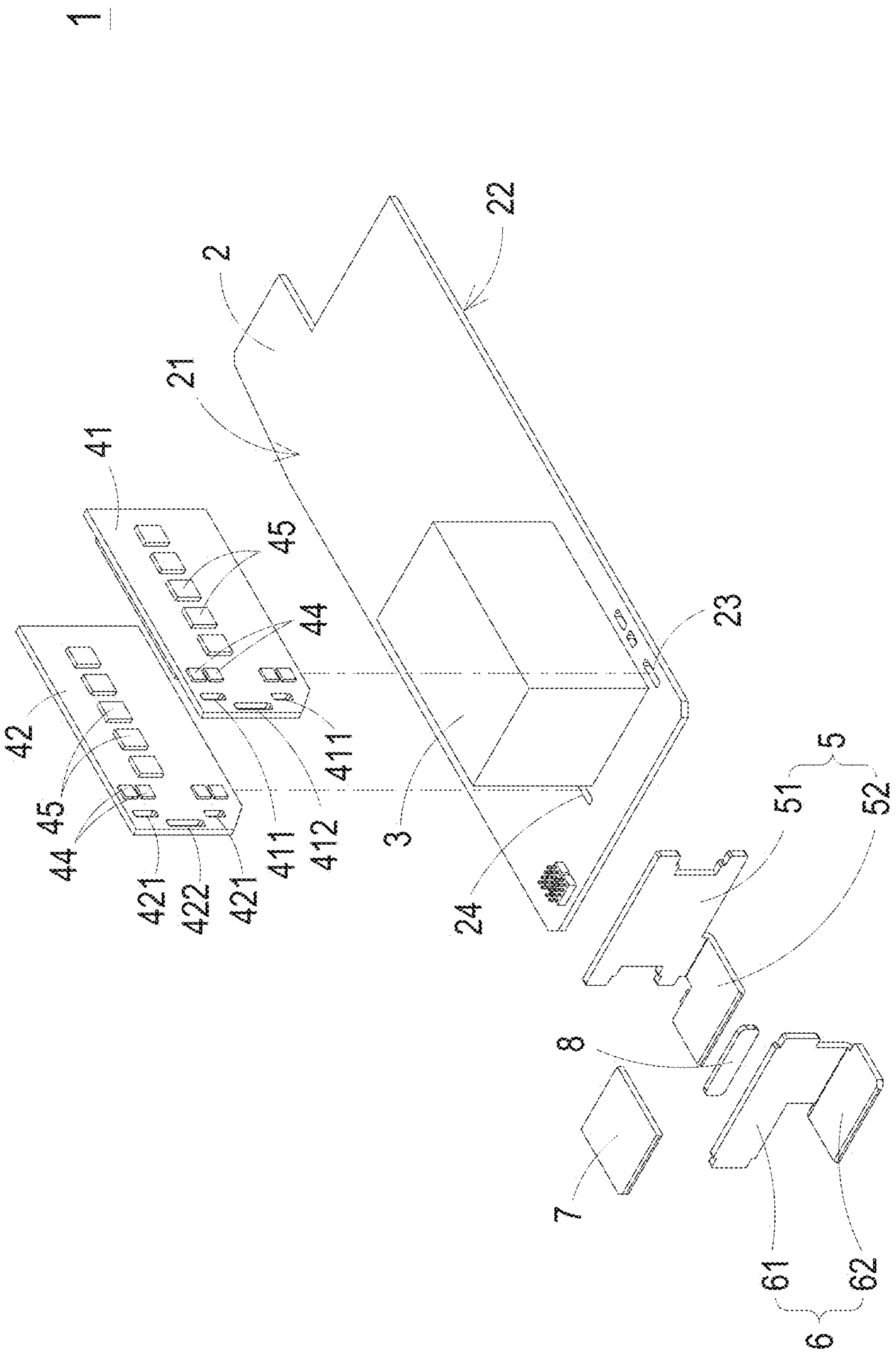
FIG. 2 is a schematic exploded view illustrating the power supply as shown in FIG. 1.

FIG. 1 is a schematic view illustrating a power supply according to a first embodiment of the present disclosure. FIG. 2 is a schematic exploded view illustrating the power supply as shown in FIG. 1. As shown in FIGS. 1 and 2, the power supply 1 of this embodiment is pluggable into a busbar slot of an external system (not shown) for power conversion. The power supply 1 includes a main board 2, a transformer 3, a rectifier assembly 4, a first output busbar 5, a second output busbar 6, a signal board 7 and a fixing assembly 8. The main board 2 includes an upper surface 21, a lower surface 22, at least one first main board through-hole 23 and at least one second main board through-hole 24. The upper surface 21 and the lower surface 22 are opposite to each other. The at least one first main board through-hole 23 and the at least one second main board through-hole 24 passes through the upper surface 21 and the lower surface 22 of the main board 2, respectively. The transformer 3 is disposed on the upper surface 21 of the main board 2 and electrically connected with the main board 2. The rectifier assembly 4 is disposed on one side of the upper surface 21 of the main board 2 and electrically connected with the transformer 3. The first output signal from the transformer 3 is rectified by the rectifier assembly 4 to generate a second output signal. The rectifier assembly 4 includes a first rectifier board 41 and a second rectifier board 42. The first rectifier board 41 is installed into the main board 2. A portion of the first rectifier board 41 is inserted into the first main board through-hole 23 of the main board 2. The first rectifier board 41 includes at least one through-hole. In this embodiment, the first rectifier board 41 includes two first through-holes 411 and a second through-hole 412. The second rectifier board 42 is installed into the main board 2. A portion of the second rectifier board 42 is inserted into the second main board through-hole 24 of the main board 2. The second rectifier board 42 includes at least one through-hole. In this embodiment, the second rectifier board 42 includes two third through-hole s 421 and a fourth through-hole 422. The number of the through-holes of the first rectifier board 41 and the second rectifier board 42 may be adjusted according to practical requirement for connecting and fixing the output busbar. The transformer 3 is disposed between the first rectifier board 41 and the second rectifier board 42. Two ends of the transformer 3 are electrically connected with the first rectifier board 41 and the second rectifier board 42, respectively. Consequently, the first output signal (i.e., current) generated by the transformer 3 is transmitted to the first rectifier board 41 and the second rectifier board 42.

The first output busbar 5 is made of metal material. For example, the first output busbar 5 is made of copper. The first output busbar 5 is disposed on the upper surface 21 of the main board 2 and includes a first sub busbar 51 and a second sub busbar 52. In some embodiments, the first sub busbar 51 and the second sub busbar 52 are integrated into one piece and bent from the first output busbar 5. The first sub busbar 51 is installed between the first rectifier board 41 and the second rectifier board 42. Two ends of the first sub busbar 51 are inserted into the at least one through-hole of the first rectifier board 41 and at least one through-hole of the second rectifier board 42. In this embodiment, a portion of the first sub busbar 51 is inserted into the first through-hole 411 of the first rectifier board 42 to form a first solder joint. The second sub busbar 52 is connected with the first sub busbar 51 and parallel to the main board 2. The second sub busbar 52 is extended in a direction away from the transformer 3 to connect with the external system.

The second output busbar 6 is made of metal material. For example, the second output busbar 6 is made of copper. The second output busbar 6 is disposed on the upper surface 21 of the main board 2 and includes a third sub busbar 61 and a fourth sub busbar 62. In some embodiments, the third sub busbar 61 and the fourth sub busbar 62 are integrated into one piece and bent from the second output busbar 6. The third sub busbar 61 is installed between the first rectifier board 41 and the second rectifier board 42. Two ends of the third sub busbar 61 are inserted into the at least one through-hole of the first rectifier board 41 and at least one through-hole of the second rectifier board 42. In this embodiment, a portion of the third sub busbar 61 is inserted into the second through-hole 412 of the first rectifier board 42 to form a third solder joint. The fourth sub busbar 62 is connected with the third sub busbar 61 and parallel to the main board 2. The fourth sub busbar 62 is extended in the direction away from the transformer 3 to connect with the external system.

The first sub busbar 51 is disposed between the transformer 3 and the third sub busbar 61. A preset distance is formed between the first sub busbar 51 and the third sub busbar 61. Consequently, the first sub busbar 51 and the third sub busbar 61 are separated from each other to avoid disturbance between each other. In this embodiment, the first sub busbar 51 and the third sub busbar 61 are fixed together using the fixing assembly 8. Consequently, this arrangement fixes the first output busbar 5 and the second output busbar 6 together, facilitating easy soldering and enhancing the manufacturing process.

Consequently, the first output signal generated by the transformer 3 is transmitted to the first rectifier board 41 and the second rectifier board 42. Then, a second output signal is generated after rectifying the first output signal. Since the first rectifier board 41 and the second rectifier board 42 are directly connected with the first output busbar 5 and the second output busbar 6, respectively, the second output signal can be directly transmitted to the external system via the first output busbar 5 and the second output busbar 6, thereby reducing the current transmission path.

The power supply 1 is installed into the busbar slot of the external system via the second sub busbar 52 and the fourth sub busbar 62 to transmit the power from the power supply 1 to the external system. For example, the external system and the power supply 1 may transmit the power to each other in two current directions. The first current direction is transmitted sequentially through the transformer 3, the first rectifier board 41, the first sub busbar 51 and the second sub busbar 52 (or the third sub busbar 61 and the fourth sub busbar 62) to the external system. The second current direction is transmitted sequentially through the transformer 3, the second rectifier board 42, the first sub busbar 51 and the second sub busbar 52 (or the third sub busbar 61 and the fourth sub busbar 62) to the external system.

The signal board 7 is disposed on the upper surface 21 of the main board 2 for communicating with the external system. The position of the signal board 7 can be adjusted according to practical requirement. In this embodiment, the signal board 7 is adjacent to the second sub busbar 52. Alternatively, the signal board 7 is adjacent to the fourth sub busbar 62 (not shown) for transmitting the signal with the external system. The signal board 7, the second sub busbar 52 and the fourth sub busbar 62 are coplanar and parallel to the main board 2.

From above, the power supply 1 of the present disclosure converts power with the external system through the second sub busbar 52 of the first output busbar 5 and the fourth sub busbar 62 of the second output busbar 6. In contrast, the conventional power supply converts power through the gold finger board. Compared with the conventional power supply, the power transmission path of the power supply 1 of the present disclosure is reduced. Moreover, the power supply 1 of the present disclosure includes only the solder joints disposed between the output busbar and the rectifier assembly 4, and the solder joints disposed between the rectifier assembly 4 and the main board 2. As a result, the number of solder joints is reduced. Consequently, the path impedance of the power supply 1 of the present disclosure is reduced. Unlike the conventional power supply, which has the gold finger board with only surface copper embedding, the power supply 1 of the present disclosure directly transmits power via the output busbar made of metal material. Consequently, the current-carrying capacity of the power supply 1 of the present disclosure is enhanced. Especially, when the power supply 1 is applied in high-current scenarios, the temperature and power loss of the power supply 1 are reduced.

In this embodiment, the first rectifier board 41 and the second rectifier board 42 of the rectifier assembly 4 include a plurality of single-pole switches 44 and a plurality of rectifier switches 45, respectively. Any one of the plurality of single-pole switches 44 is disposed between the plurality of rectifier switches 45 and the through-holes disposed on the rectifier board. The current transmission path sequentially passes through the rectifier switches 45, the single-pole switches 44 and the output busbar. Each single-pole switch 44 controls the first output signal (i.e., current) from the transformer 3 to flow along signal way. Namely, the first output signal generated by the transformer 3 only transmits to the external system. Preferably but not exclusively, the single-pole switch 44 is a MOSFET or an IGBT. In this embodiment, the single-pole switch 44 disposed on the first rectifier board 41 is adjacent to the first through-hole 411 of the first rectifier board 41 and the second through-hole 412 of the first rectifier board 41. The single-pole switch 44 disposed on the second rectifier board 42 is adjacent to the third through-hole 421 of the second rectifier board 42 and the fourth through-hole 422 of the second rectifier board 42.

Figure 3:
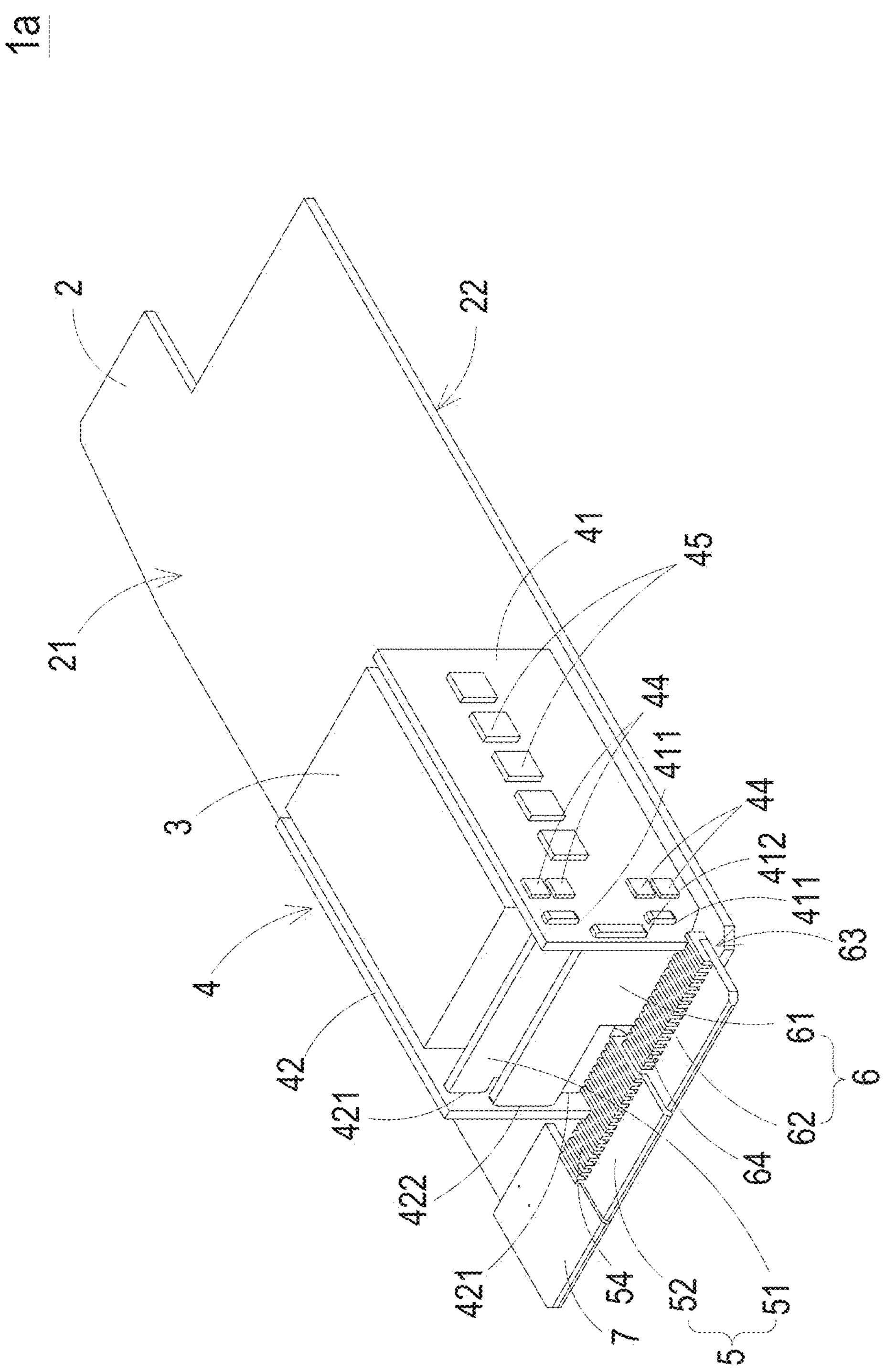
FIG. 3 is a schematic view illustrating a power supply according to a second embodiment of the present disclosure.
Figure 4:
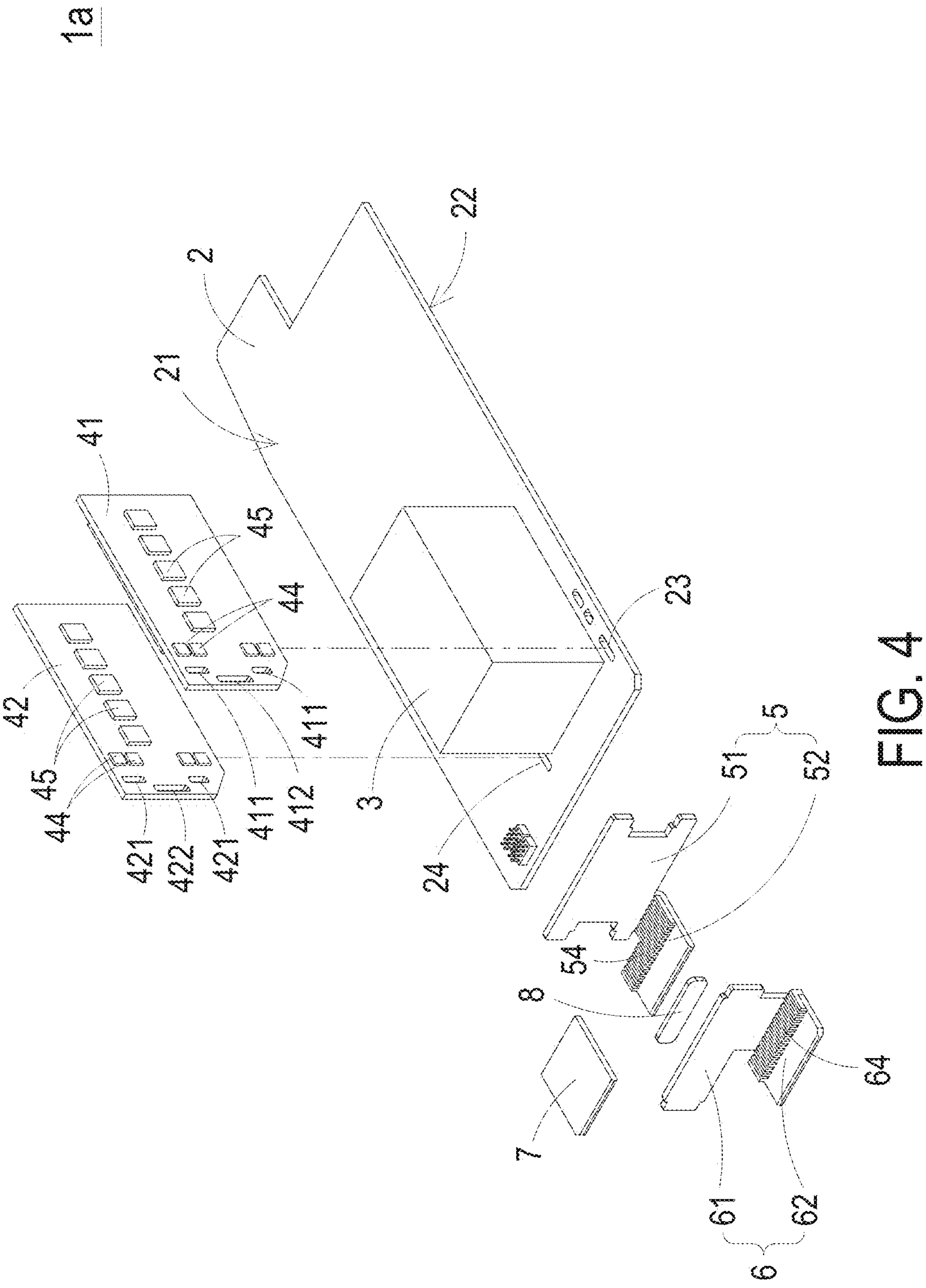
FIG. 4 is a schematic exploded view illustrating the power supply as shown in FIG. 3.

In some embodiments, the output busbar includes at least one thermal dissipation tooth for enhancing the thermal dissipation. FIG. 3 is a schematic view illustrating a power supply according to a second embodiment of the present disclosure. FIG. 4 is a schematic exploded view illustrating the power supply as shown in FIG. 3. Compared with the power supply 1 of FIGS. 1 and 2, as shown in FIGS. 3 and 4, the first output busbar 5 of the power supply 1*a* of this embodiment includes a plurality of first thermal dissipation teeth 54. The plurality of first thermal dissipation teeth 54 are disposed on the second sub busbar 52 and extended away from the second sub busbar 52. To ensure the connection between the second sub busbar 52 and the busbar slot of the external system, the plurality of first thermal dissipation teeth 54 cover only a portion of the second sub busbar 52 and are adjacent to the first sub busbar 51. Alternatively, the plurality of first thermal dissipation teeth 54 may be disposed on the first sub busbar 51 and extended away from the first sub busbar 51 (not shown). In this embodiment, the second output busbar 6 of the power supply 1*a* may include a plurality of second thermal dissipation teeth 64. The plurality of second thermal dissipation teeth 64 are disposed on the fourth sub busbar 62 and extended away from the fourth sub busbar 62. To ensure the connection between the fourth sub busbar 62 and the busbar slot of the external system, the plurality of second thermal dissipation teeth 64 cover only a portion of the fourth sub busbar 62 and are adjacent to the third sub busbar 61. Alternatively, the plurality of second thermal dissipation teeth 64 may be disposed on the third sub busbar 61 and extended away from the third sub busbar 61 (not shown).

Figure 5:
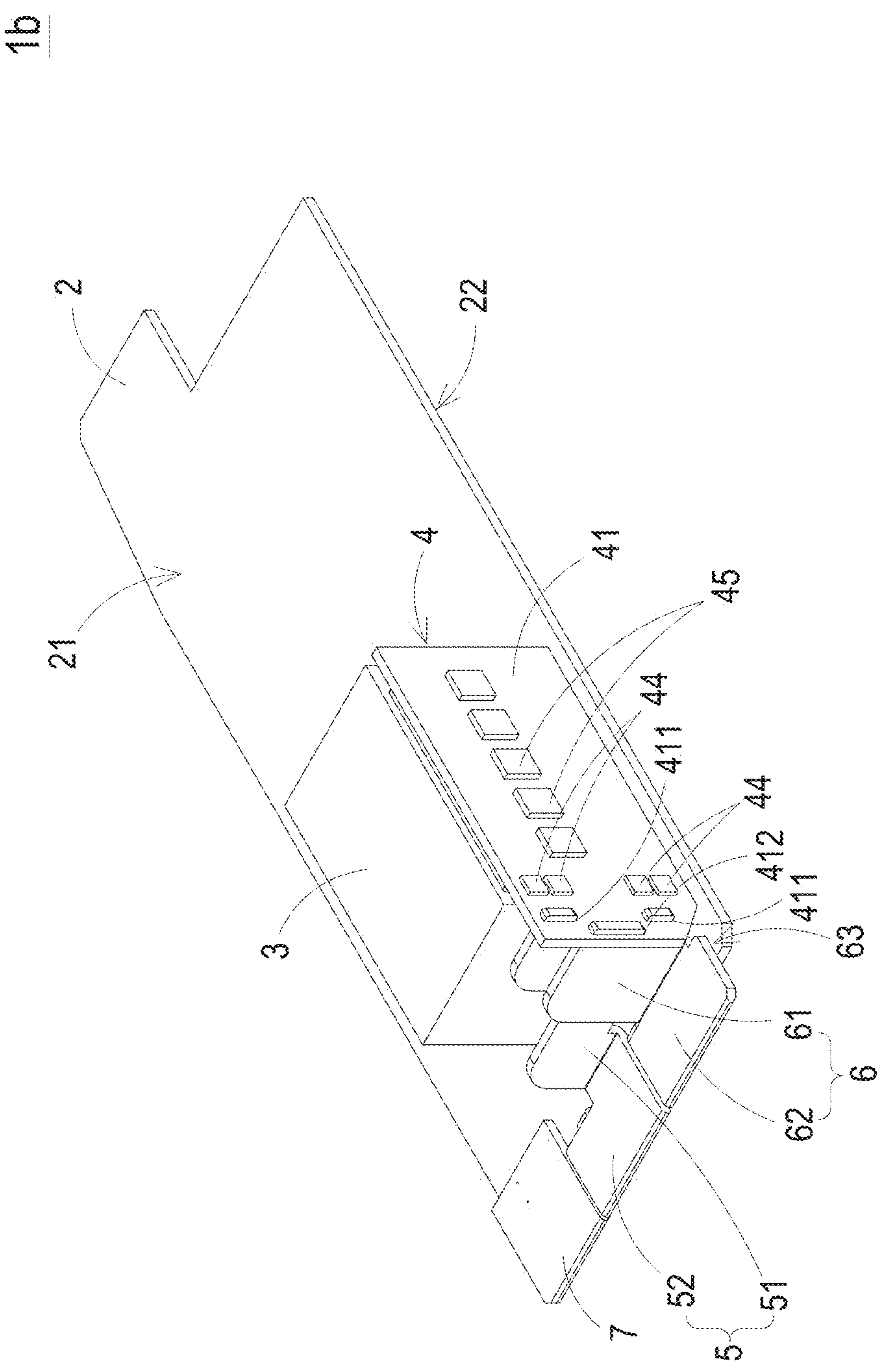
FIG. 5 is a schematic view illustrating a power supply according to a third embodiment of the present disclosure.
Figure 6:
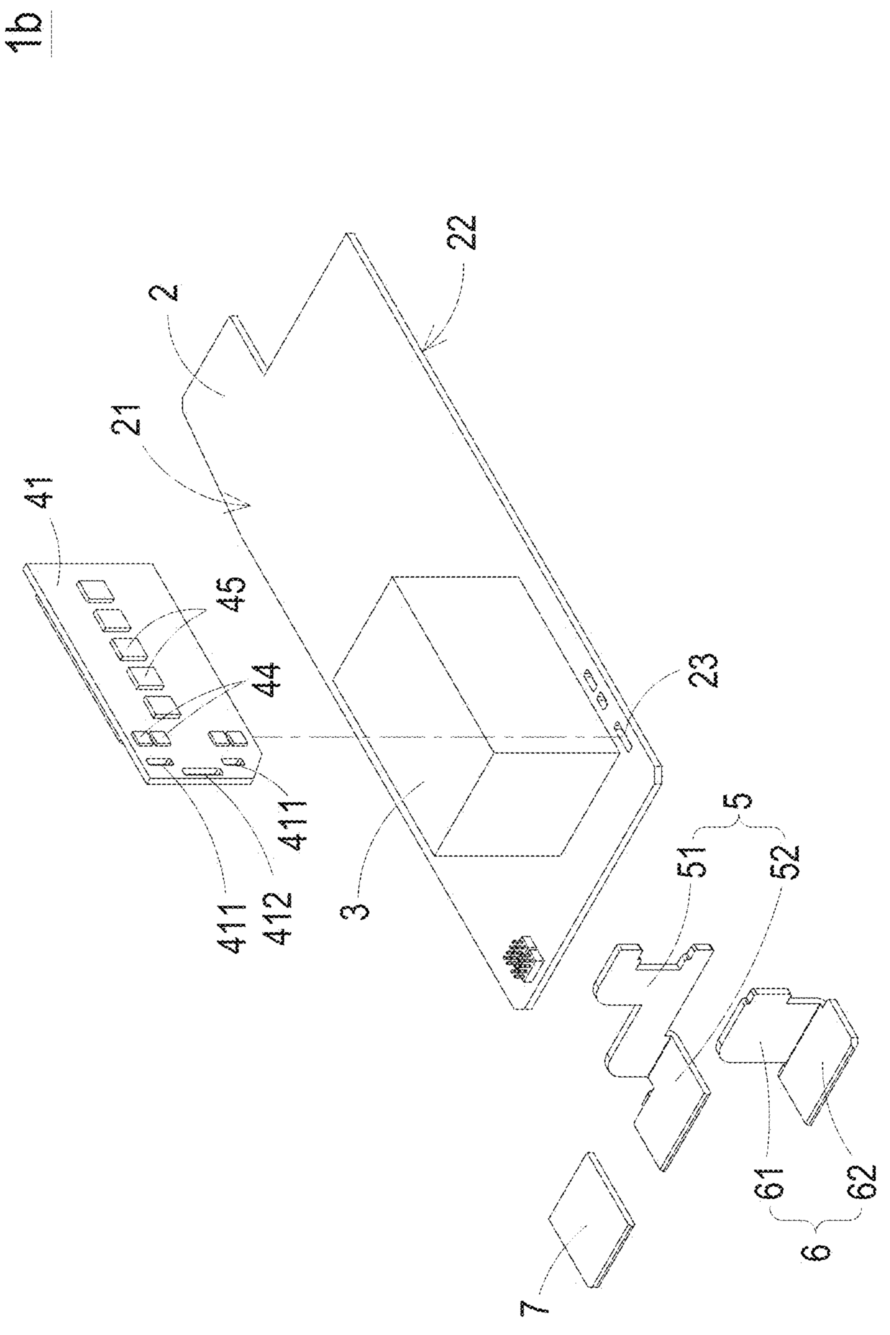
FIG. 6 is a schematic exploded view illustrating the power supply as shown in FIG. 5.

In some embodiments, the number of the rectifier board of the rectifier assembly of the power supply can be adjusted. For example, the number of the rectifier board of the rectifier assembly of the power supply can be one. FIG. 5 is a schematic view illustrating a power supply according to a third embodiment of the present disclosure. FIG. 6 is a schematic exploded view illustrating the power supply as shown in FIG. 5. Compared with the power supply 1 of FIGS. 1 and 2, as shown in FIGS. 5 and 6, the rectifier assembly 4 of the power supply 1*b* of this embodiment only includes the first rectifier board 41. The transformer 3, the first sub busbar 51 and the third sub busbar 61 of the power supply 1*b* are adjacent to the same surface of the first rectifier board 41.

Figure 7:
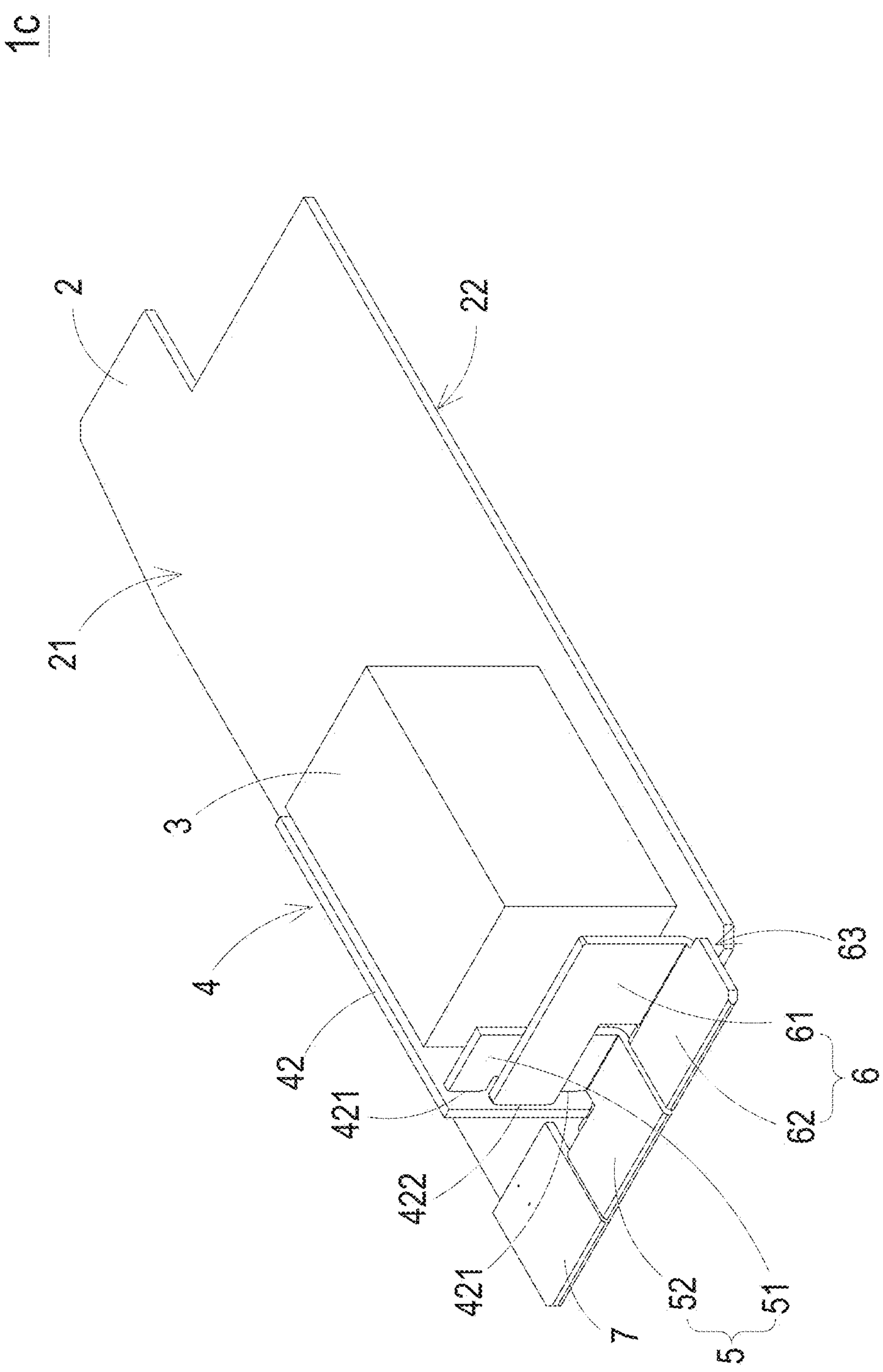
FIG. 7 is a schematic view illustrating a power supply according to a fourth embodiment of the present disclosure.
Figure 8:
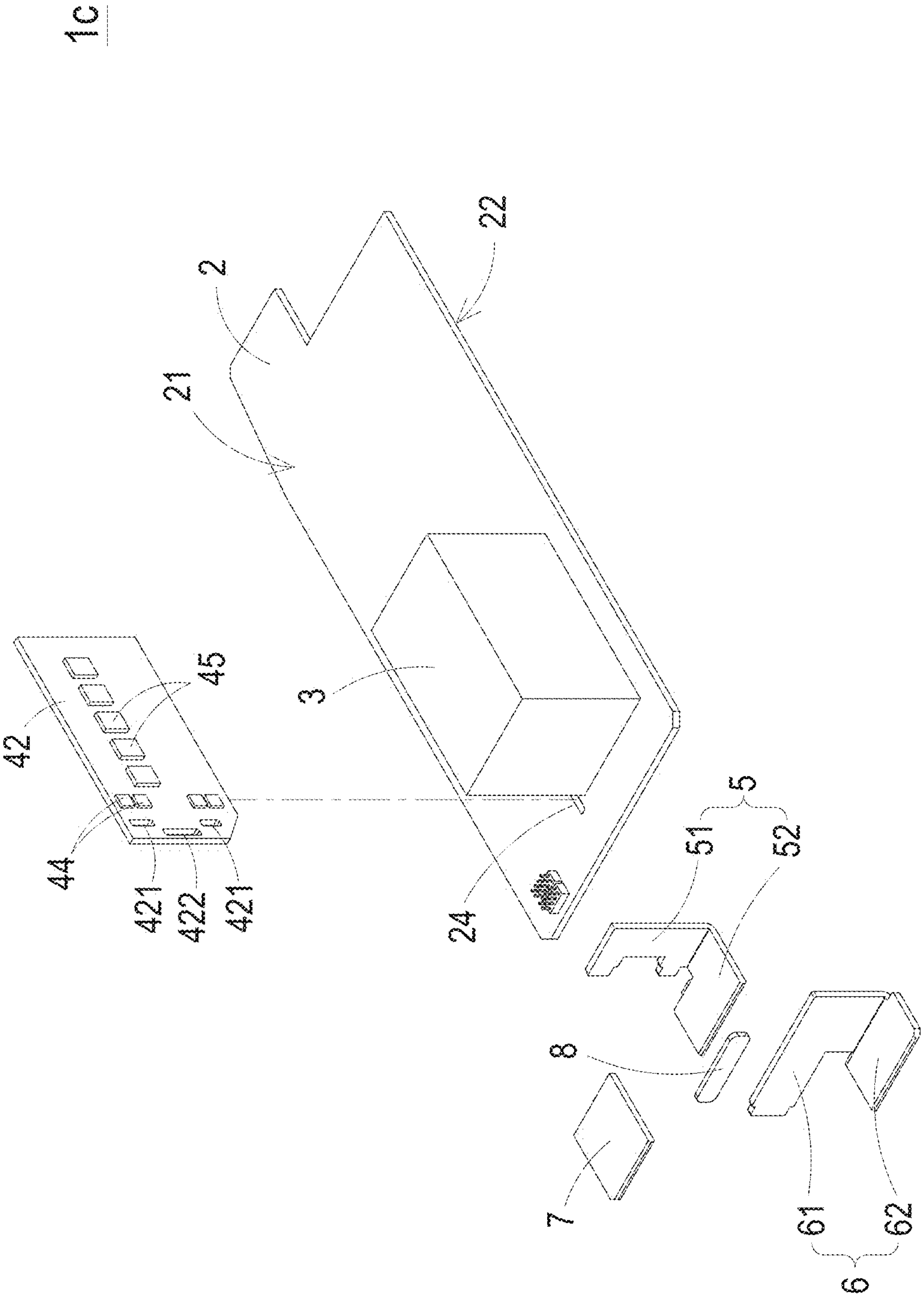
FIG. 8 is a schematic exploded view illustrating the power supply as shown in FIG. 7.

FIG. 7 is a schematic view illustrating a power supply according to a fourth embodiment of the present disclosure. FIG. 8 is a schematic exploded view illustrating the power supply as shown in FIG. 7. Compared with the power supply 1 of FIGS. 1 and 2, as shown in FIGS. 7 and 8, the rectifier assembly 4 of the power supply 1*c* of this embodiment only includes the second rectifier board 42. The transformer 3, the first sub busbar 51 and the third sub busbar 61 of the power supply 1*c* are adjacent to the same surface of the second rectifier board 42.

Figure 9:
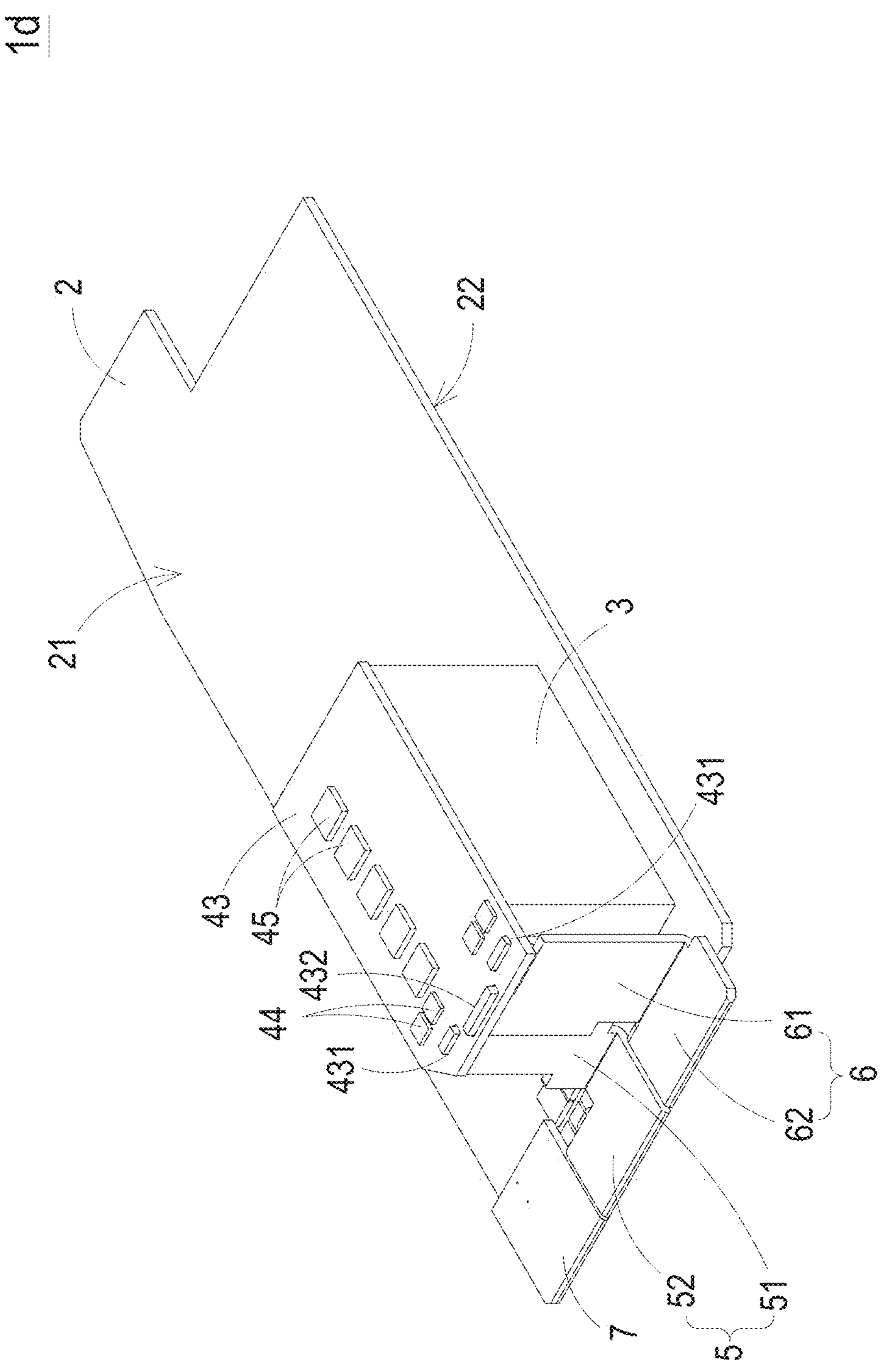
FIG. 9 is a schematic view illustrating a power supply according to a fifth embodiment of the present disclosure.
Figure 10:
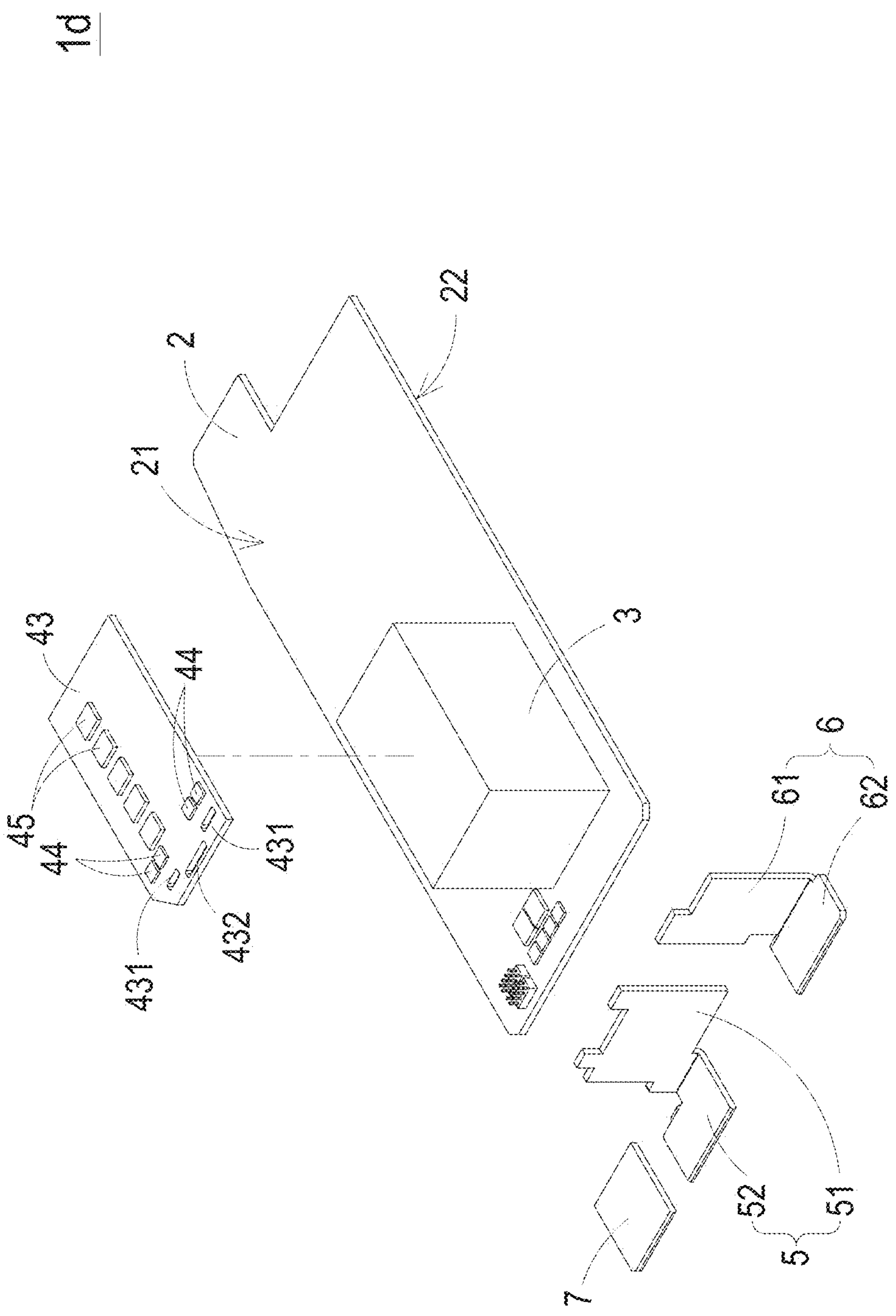
FIG. 10 is a schematic exploded view illustrating the power supply as shown in FIG. 9.

FIG. 9 is a schematic view illustrating a power supply according to a fifth embodiment of the present disclosure. FIG. 10 is a schematic exploded view illustrating the power supply as shown in FIG. 9. Compared with the power supply 1 of FIGS. 1 and 2, as shown in FIGS. 9 and 10, the rectifier assembly 4 of the power supply 1*d* of this embodiment only includes a third rectifier board 43. The third rectifier board 43 includes two fifth through-holes 431, a sixth through-hole 432, a plurality of single-pole switches 44 and a plurality of rectifier switches 45. The two fifth through-holes 431 pass through the third rectifier board 43, and the sixth through-hole 432 passes through the third rectifier board 43. The first sub busbar 51 and the third sub busbar 61 are inserted into the third rectifier board 43, respectively. A portion of the first sub busbar 51 is inserted into the fifth through-hole 431 of the third rectifier board 43 to form a fifth solder joint. Another portion of the third sub busbar 61 is inserted into the sixth through-hole 432 of the third rectifier board 43 to form a sixth solder joint. The transformer 3 is disposed between the third rectifier board 43 and the main board 2. The single-pole switches 44 disposed on the third rectifier board 43 are adjacent to the fifth through-hole 431 of the third rectifier board 43 and the sixth through-hole 432 of the third rectifier board 43. The single-pole switches 44 are disposed between the fifth through-hole 431 and the rectifier switches 45. Alternatively, the single-pole switches 44 may be disposed between the sixth through-hole 432 and the rectifier switches 45.

Figure 11:
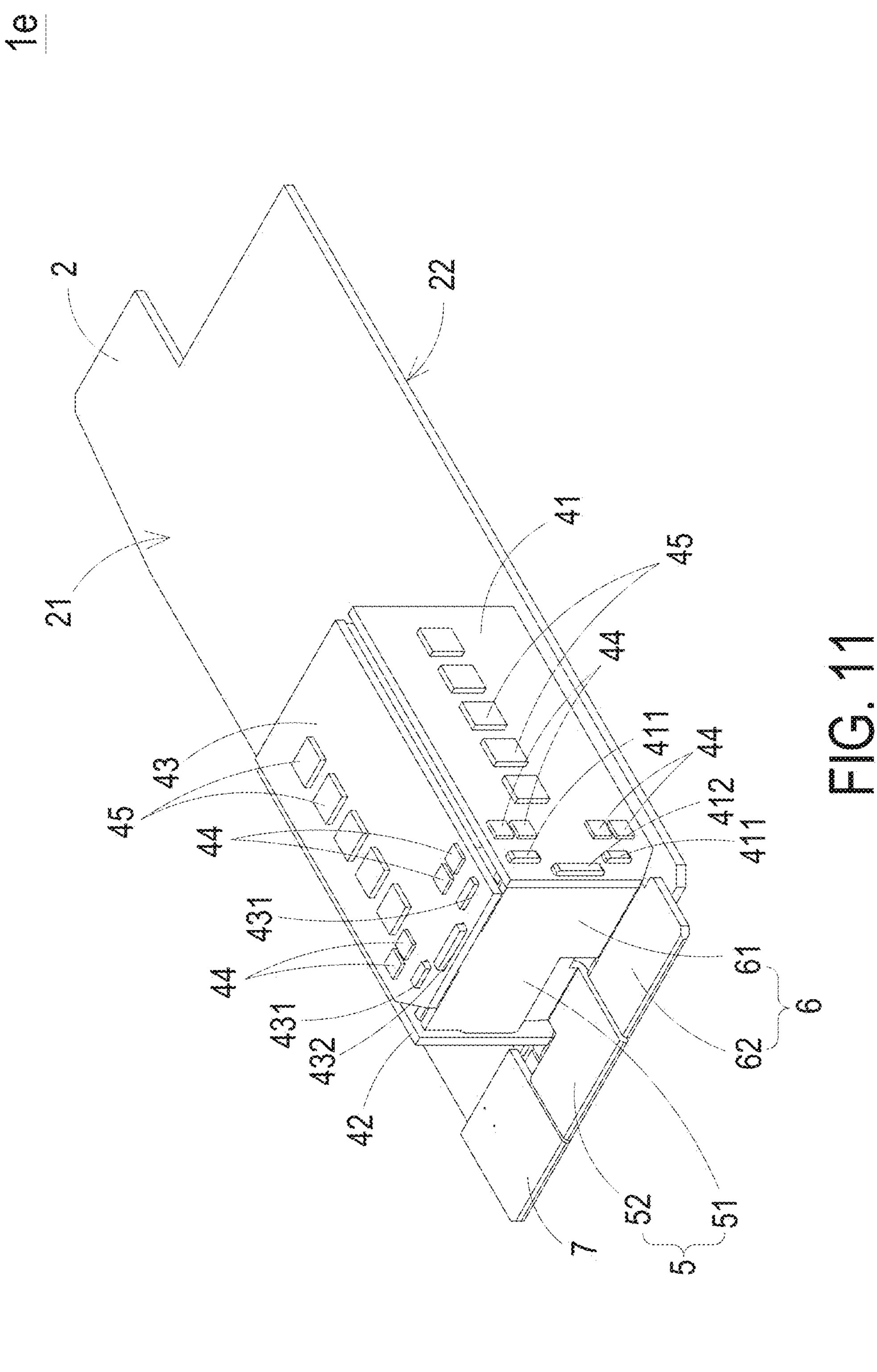
FIG. 11 is a schematic view illustrating a power supply according to a sixth embodiment of the present disclosure.
Figure 12:
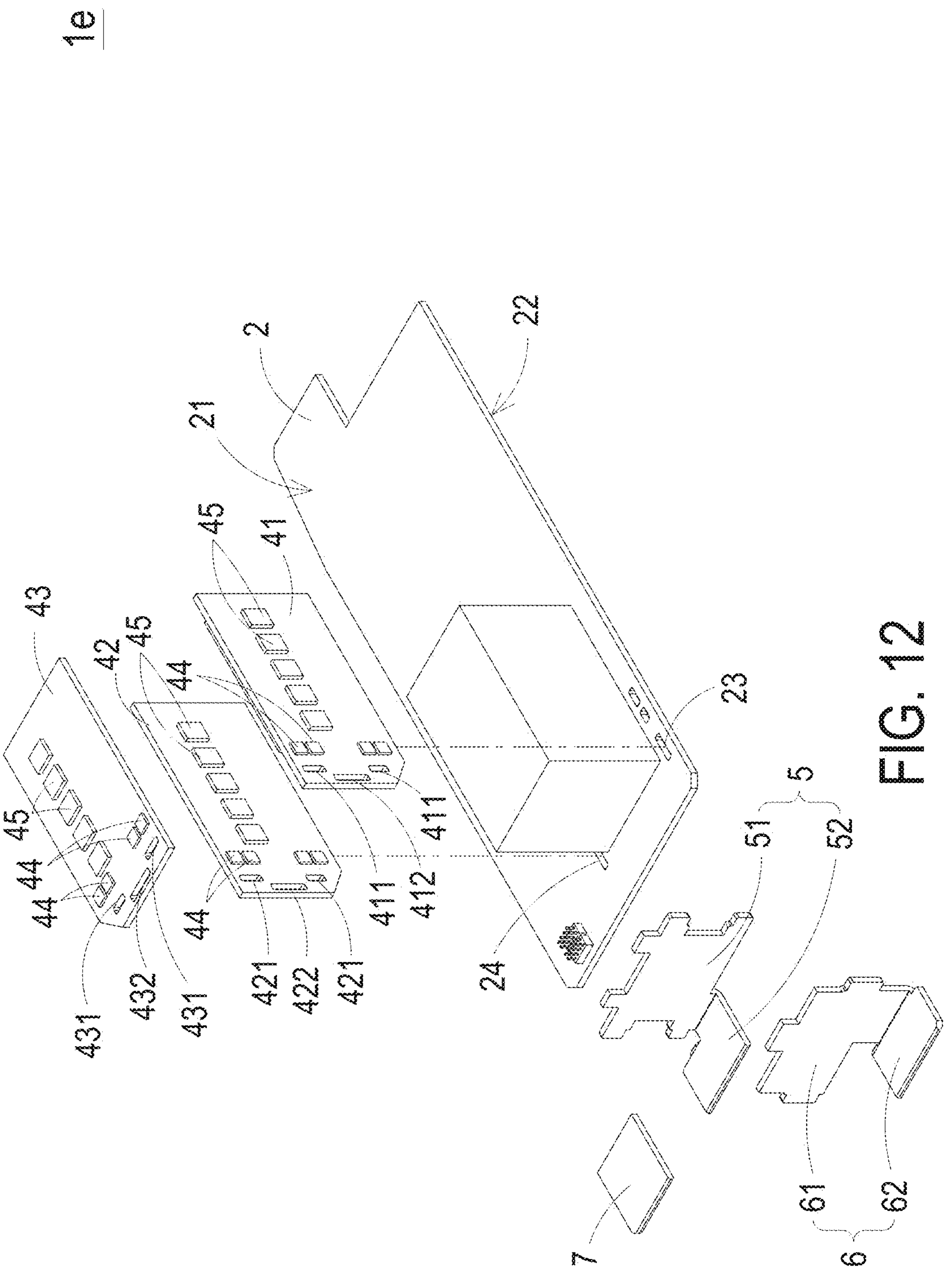
FIG. 12 is a schematic exploded view illustrating the power supply as shown in FIG. 11.

In some embodiments, the number of the rectifier boards of the rectifier assembly of the power supply can be adjusted. For example, the number of the rectifier board of the rectifier assembly of the power supply can be three. FIG. 11 is a schematic view illustrating a power supply according to a sixth embodiment of the present disclosure. FIG. 12 is a schematic exploded view illustrating the power supply as shown in FIG. 11. Compared with the power supply 1 of FIGS. 1 and 2, as shown in FIGS. 11 and 12, the rectifier assembly 4 of the power supply 1*e* of this embodiment further includes a third rectifier board 43.

The third rectifier board 43 includes two fifth through-holes 431, a sixth through-hole 432, a plurality of single-pole switches 44 and a plurality of rectifier switches 45. The fifth through-hole 431 and the sixth hole 432 respectively penetrate the third rectifier board 43. The first sub busbar 51 and the third sub busbar 61 are inserted into the third rectifier board 43, respectively. A portion of the first sub busbar 51 is inserted into the fifth hole 431 of the third rectifier board 43 to form a fifth solder joint. Another portion of the third sub busbar 61 is inserted into the sixth hole 432 of the third rectifier board 43 to form a sixth solder joint. The transformer 3 is disposed between the third rectifier board 43 and the main board 2. Three ends of the first sub busbar 51 are inserted into the through-hole of the first rectifier board 41, the through-hole of the second rectifier board 42 and through-hole of the third rectifier board 4, respectively. Three ends of the third sub busbar 61 are inserted into the through-hole of the first rectifier board 41, the through-hole of the second rectifier board 42 and through-hole of the third rectifier board 4, respectively. The first rectifier board 41, the third rectifier board 43, the second rectifier board 42 and the main board 2 are disposed around the transformer 3 in sequence.

Figure 13:
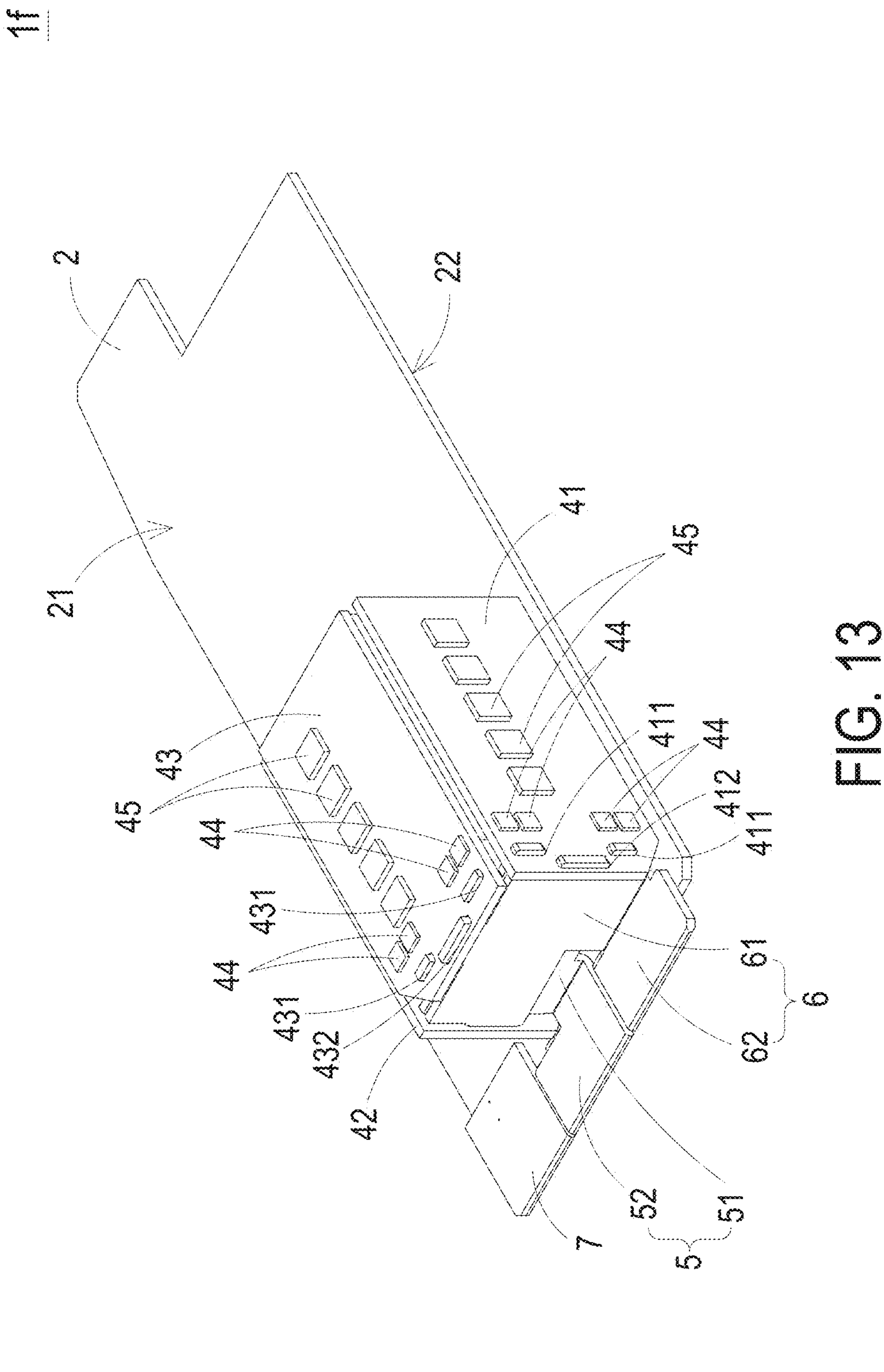
FIG. 13 is a schematic view illustrating a power supply according to a seventh embodiment of the present disclosure.
Figure 14:
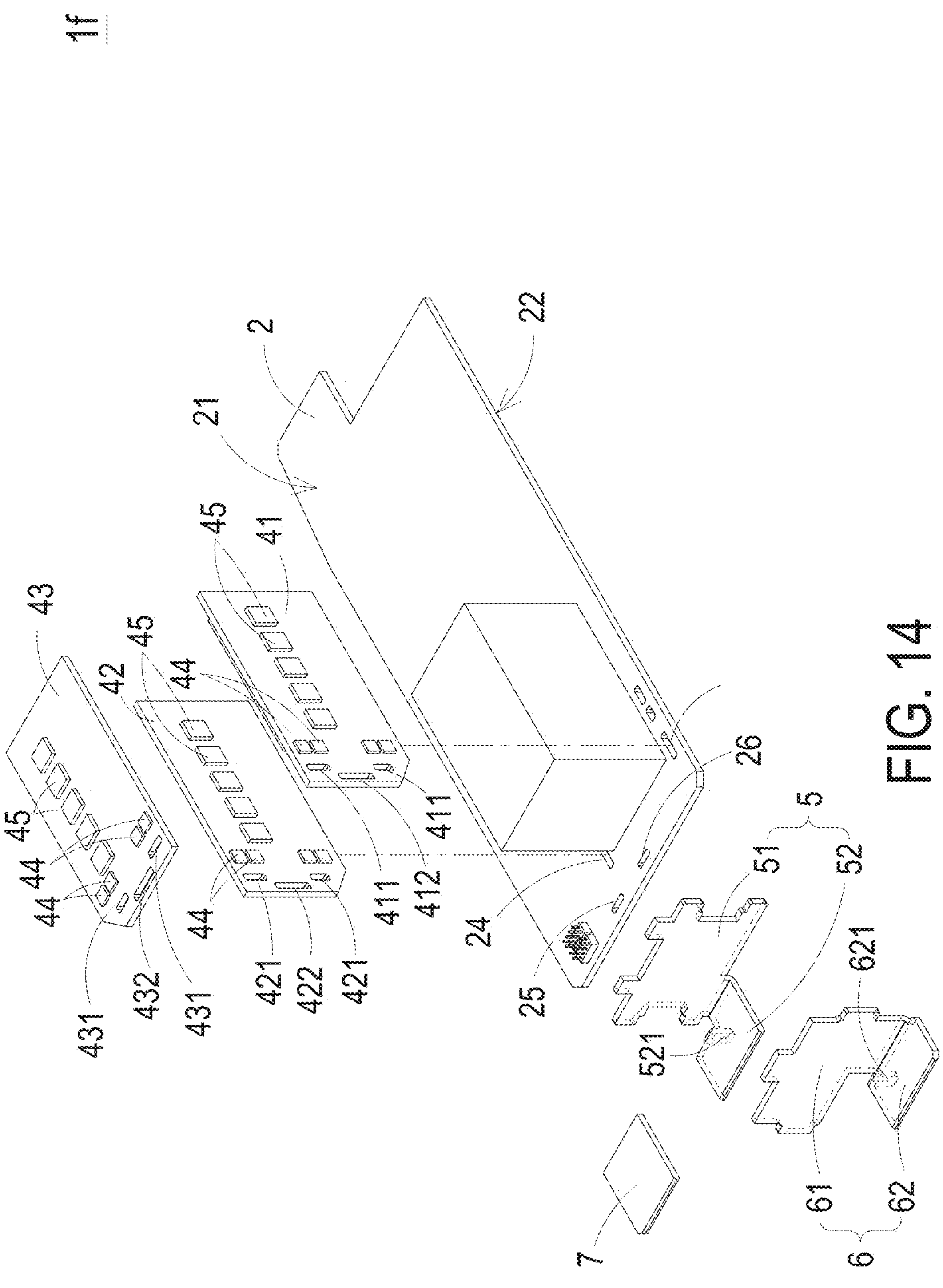
FIG. 14 is a schematic exploded view illustrating the power supply as shown in FIG. 13.

In some embodiments, the main board of the power supply can have rectification functionality. FIG. 13 is a schematic view illustrating a power supply according to a seventh embodiment of the present disclosure. FIG. 14 is a schematic exploded view illustrating the power supply as shown in FIG. 13. Compared with the power supply 1*e* of FIGS. 11 and 12, as shown in FIGS. 13 and 14, the main board 2 of the power supply 1*f* of this embodiment further includes a third main board through-hole 25 and a fourth main board through-hole 26. The first output busbar 5 includes at least one first penetration portion 521, and the second output busbar 6 includes at least one second penetration portion 621. These portions are used to fix the first output busbar 5 and the second output busbar 6 onto the main board 2 and to reduce the stress on the through-holes of the main board 2. The first penetration portion 521 may be disposed on the first sub busbar 51 or the second sub busbar 52. The second penetration portion 621 may be disposed on the third sub busbar 61 or the fourth sub busbar 62. In this embodiment, the first sub busbar 51 of the first output busbar 5 of the power supply If is inserted into the corresponding through-hole of the first rectifier board 41, the corresponding through-hole of the second rectifier board 42 and the corresponding through-hole of the third rectifier board 43, and the second sub busbar 52 of the first output busbar 5 is inserted into the third main board through-hole 25 of the main board 2 through the first penetration portion 521. The main board 2 having rectification functionality may transmit power through the first output busbar 5. Certainly, the third sub busbar 61 of the second output busbar 6 is inserted into the corresponding through-hole of the first rectifier board 41, the corresponding through-hole of the second rectifier board 42 and the corresponding through-hole of the third rectifier board 43, and the fourth sub busbar 62 of the second output busbar 6 is inserted into the fourth main board through-hole 26 of the main board 2 through the second penetration portion 621. The main board 2 having rectification functionality may transmit power via the second output busbar 6.

In some embodiments, no matter how many rectifier boards 4 are present in the rectifier assembly of the power supply, it is possible to install the first penetration portion 521 on the first output busbar 5 and the second penetration portion 621 on the second output busbar 6. Namely, the power supply illustrated in FIGS. 1 to 10 of the present disclosure may also include the first penetration portion 521 and the second penetration portion 621 for reducing the stress on the main board 2.

As mentioned above, the power supply of the present disclosure includes the first output busbar and the second output busbar. The first sub busbar of the first output busbar and the third sub busbar of the second output busbar are installed on the rectifier assembly, respectively. The power supply converts power with the external system via the second sub busbar of the first output busbar and the fourth sub busbar of the second output busbar. Compared with the conventional power supply, which converts power via the gold finger board, the power transmission path of the power supply of the present disclosure is reduced. Moreover, the power supply of the present disclosure includes only the solder joints disposed between the output busbar and the rectifier assembly, and the solder joints disposed between the rectifier assembly and the main board, thereby reducing the number of solder joints. Consequently, the path impedance of the power supply of the present disclosure is reduced. Moreover, the power supply of the present disclosure directly transmits power via the metal output busbar, enhancing the current-carrying capacity of the power supply of the present disclosure. Especially in high-current scenarios, this design reduces both the temperature and power loss of the power supply 1.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply, comprising:

a main board comprising an upper surface and a lower surface;

a transformer disposed on the upper surface of the main board and electrically connected with the main board;

a rectifier assembly disposed on one side of the upper surface of the main board and electrically connected with the transformer, wherein the rectifier assembly is configured to rectify the output of the transformer;

a first output busbar disposed on the upper surface of the main board and comprising a first sub busbar and a second sub busbar, wherein the first sub busbar and the rectifier assembly are connected with each other, and the second sub busbar is parallel to the main board and extended in a direction away from the transformer; and a second output busbar disposed on the upper surface of the main board and comprising a third sub busbar and a fourth sub busbar, wherein the third sub busbar and the rectifier assembly are connected with each other, and the fourth sub busbar is parallel to the main board and extended in the direction away from the transformer.

2. The power supply according to claim 1, wherein the first sub busbar is disposed between the third sub busbar and the transformer, and a preset distance is formed between the first sub busbar and the third sub busbar.

3. The power supply according to claim 1, wherein the rectifier assembly comprises at least one rectifier board, the at least one rectifier board is adjacent to one side of the transformer, the first sub busbar and the third sub busbar are adjacent to one side of the at least one rectifier board adjacent to the transformer, and both the first sub busbar and the third sub busbar are inserted into the at least one rectifier board.

4. The power supply according to claim 1, wherein the rectifier assembly comprises a rectifier board installed into the main board, the first sub busbar and the third sub busbar are inserted into the rectifier board, respectively, and the transformer, the first sub busbar and the third sub busbar are adjacent to the same surface of the rectifier board.

5. The power supply according to claim 1, wherein the rectifier assembly comprises a rectifier board, the first sub busbar and the third sub busbar are inserted into the rectifier board, respectively, and the transformer, the first sub busbar and the third sub busbar are disposed between the rectifier board and the main board.

6. The power supply according to claim 1, wherein the rectifier assembly comprises a first rectifier board and a second rectifier board, the first rectifier board and the second rectifier board are inserted into the main board, respectively, the transformer is disposed between the first rectifier board and the second rectifier board, wherein two ends of the first sub busbar are inserted into the first rectifier board and the second rectifier board, respectively, and two ends of the third sub busbar are inserted into the first rectifier board and the second rectifier board, respectively.

7. The power supply according to claim 6, wherein the rectifier assembly comprises a third rectifier board, the transformer is disposed between the third rectifier board and the main board, wherein three ends of the first sub busbar are inserted into the first rectifier board, the second rectifier board and the third rectifier board, respectively, and three ends of the third sub busbar are inserted into the first rectifier board, the second rectifier board and the third rectifier board, respectively.

8. The power supply according to claim 1, wherein the first output busbar is connected with the main board through a first penetration portion, and the second output busbar is connected with the main board through a second penetration portion.

9. The power supply according to claim 1, wherein the rectifier assembly comprises at least one rectifier board, a plurality of single-pole switches and a plurality of rectifier switches, the plurality of single-pole switches and the plurality of rectifier switches are disposed on the at least one rectifier board, and any one of the plurality of single-pole switches is disposed between the through-holes of the at least one rectifier board, into which the first sub busbar or the third sub busbar is inserted, and the plurality of rectifier switches.

10. The power supply according to claim 1, wherein the first output busbar and the second output busbar are made of metal material.

11. The power supply according to claim 1, wherein the power supply comprises a fixing assembly for fixing the first sub busbar and the third sub busbar.

12. The power supply according to claim 1, wherein the power supply comprises a signal board disposed on the upper surface of the main board for communicating with an external system.

13. The power supply according to claim 12, wherein the signal board is adjacent to the second sub busbar or the fourth sub busbar, and the signal board, the second sub busbar and the fourth sub busbar are parallel to the main board.

14. The power supply according to claim 1, wherein the first sub busbar comprises a plurality of thermal dissipation teeth extended away from the first sub busbar, or the third sub busbar comprises a plurality of thermal dissipation teeth extended away from the third sub busbar.

15. The power supply according to claim 1, wherein the second sub busbar comprises a plurality of thermal dissipation teeth extended away from the second sub busbar, or the fourth sub busbar comprises a plurality of thermal dissipation teeth extended away from the fourth sub busbar.

* * * * *